Figure 1:
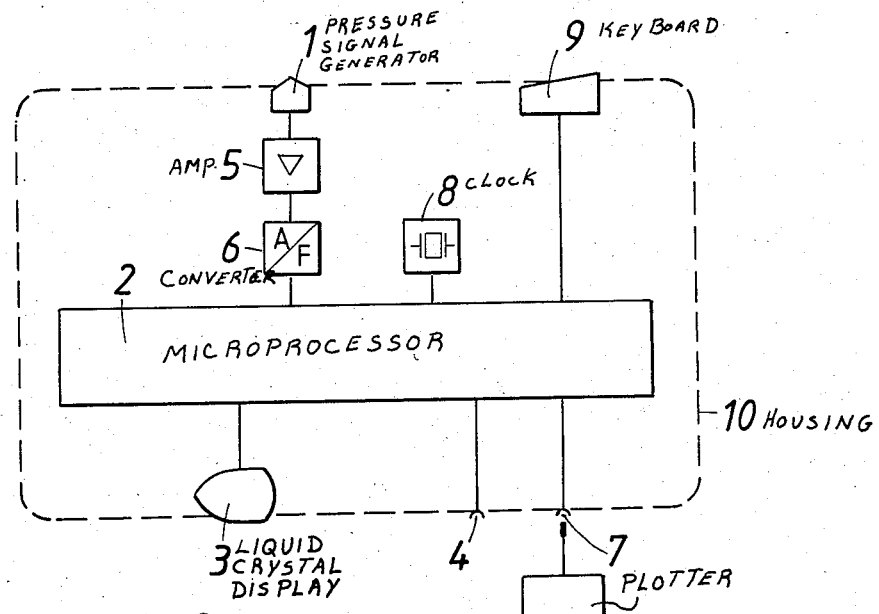

United States Patent [19]

Wögerbauer

[11] Patent Number: 4,631,960
[45] Date of Patent: Dec. 30, 1986

[54] ELECTRONIC RECORDING MANOMETER

[75] Inventor: Johann Wögerbauer, Linz, Austria

[73] Assignee: Sprecher & Schuh Gesellschaft m.b.H., Linz, Austria

[21] Appl. No.: 714,818

[22] Filed: Mar. 22, 1985

[30] Foreign Application Priority Data

Mar. 29, 1984 [AT] Austria ................................ 1051/84

[51] Int. Cl.⁴ ........................... G01L 9/00; G01W 1/00
[52] U.S. Cl. ........................................ 73/384; 73/712;
340/601; 340/626
[58] Field of Search ...................... 73/170 R, 384, 385,
73/386, 387, 178 R, 712; 364/420, 443;
340/601, 626

[56] References Cited

U.S. PATENT DOCUMENTS

| 3,753,117 | 8/1973 | Downing et al. | 73/170 R |
| 3,924,464 | 12/1975 | Cummins | 73/170 R |
| 4,218,755 | 8/1980 | Root | 73/170 R |
| 4,279,028 | 7/1981 | Lowdenslager et al. | 73/170 R |
| 4,287,762 | 9/1981 | Baer | 73/170 R |
| 4,395,915 | 8/1983 | Singh | 73/720 |

FOREIGN PATENT DOCUMENTS 2915682 10/1979 Fed. Rep. of Germany .

Primary Examiner—Donald O. Woodiel
Attorney, Agent, or Firm—Kurt Kelman

[57] ABSTRACT

The electronic recording manometer is intended particularly for the graphical representation of atmospheric pressure and for use aboard ship. A generator element (1,5,6) supplying pressure-equivalent electric pulses is connected to the input of a microprocessor (2). The microprocessor (2) is provided with a clock unit (8) and a memory unit in which a calendar is stored, and which records the measured pressure values for a predetermined length of time. The outputs (4, 7) of the microprocessor (2) are connected to a liquid crystal display (3) to provide digital pressure display and graphic representation of the march of pressure, as well as being connected to a visual and/or acoustic warning device. The warning device is actuated if the pressure rate of the pressure drop exceeds a value between 0.5 and 5 mb/hour. The clock unit (8) and the memory unit can be adjusted and/or called up by means of film keyboard elements (9).

5 Claims, 2 Drawing Figures

ELECTRONIC RECORDING MANOMETER

This invention relates to an electronic recording manometer, and in particular to an atmospheric pressure recording manometer for use on board ship, with an atmospheric pressure signal generator element connected to the input of a microprocessor supplying pressure-equivalent electrical output signal pulses.

It is well-known that pressure compensation occurs between masses of atmospheric air with different pressures and different temperatures. It is accordingly possible to forecast wind speeds, wind directions and atmospheric temperatures which can be anticipated locally, from the state of the atmospheric pressure.

Atmospheric pressure is one of the most important factors in weather forecasting. The more quickly the atmospheric pressure changes, the higher the locally-expected wind speeds will be. International maritime regulations accordingly prescribe that the atmospheric pressure be measured and entered in the logbook at specific intervals of time. The most usual instruments for measuring atmospheric pressure are barometers, which indicate the pressure either by displacing a column of liquid or by deforming a flexible diaphragm, a system known as the aneroid barometer. Electronic recording manometers with digital displays are also known.

DE-OS 29 15 682, discloses an digital electronic chronometer equipped with a circuit for digital pressure or height display by means of a liquid crystal display (LCD). The pressure sensor consists of two quartz oscillators, of which one projects directly into the ambient air and changes its frequency under the influence of pressure fluctuations. In addition to producing the digital display, the circuit can also provide a "tendency" display. After making comparisons of pressure values, this display makes use of symbols, e.g. arrows, preceding marks in front of the digits, or a lamp, to indicate tendencies for the pressure to rise or fall.

U.S. Pat. No. 3,924,464 describes an aneroid barometer which shows the pressure rate, i.e. the pressure change, per time unit by means of a pointer. Recording manometers are familiar for continuous recording of atmospheric pressure changes, consisting of a recording arm connected to an aneroid barometer. Such recording manometers, however, also known as barographs, can be made insensitive to vibration, waterproof, and salt-water resistant only at relatively high manufacturing costs.

The use of a microprocessor for pressure measurement is known, for example, from U.S. Pat. No. 4,395,915, which describes an instrument based on piezo-resistive pressure sensors, with which both the static pressure as well as the differential pressure of a process liquid can be measured, the liquid flowing through a primary element, for example a measuring orifice, nozzle, or venturi tube. The instrument contains a double pressure signal generator-transmitter for two differing pressures, and possibly also a temperature sensor.

A microprocessor with a memory circuit can be provided, in order to calculate from the static pressure, differential pressure, and the temperature, the volume flow of the process liquid which is passing through the primary element. A readoff device can be connected to the microprocessor for the numerical display of the volume flow.

The object of the present invention is an electronic recording manometer, in particular an atmospheric pressure recording manometer, for use on board ship, which can be made vibration-insensitive, waterproof, and salt-water resistant in an economically viable manner. The instrument can also be equipped with an automatic atmospheric pressure monitoring system, graphic representation of the development of the atmospheric pressure, free programming capability, and a visual or acoustic warning device for abnormal variations, as well as being adaptable for additional measuring and display functions.

These objects are achieved with a microprocessor equipped not only with a conventional clock unit, but also with a memory unit in which a calendar is stored, which records the measured pressure values for a predetermined length of time, as well as having an additional storage capacity, for example, for geographical and/or meteorological data. The outputs of the microprocessor are connected to an LCD for digital atmospheric pressure display and graphic representation of the development of the atmospheric pressure, as well as with a visual and/or acoustic warning device which is actuated when the rate of the pressure drop exceeds a predetermined value between 0.5 and 5 mb/hour. The clock unit and the memory unit are adjustable and/or capable of being called up by means of film keyboard elements.

All elements are vibration-insensitive, and in this combination enable continuous display of the atmospheric pressure and graphic representation of the development of the atmospheric pressure related to the clock unit. If the atmospheric pressure rate exceeds a specific value, the visual and/or acoustic warning device is triggered. The memory unit in the microprocessor can be used to store and call up the development of the atmospheric pressure over a specific period of time. Additional measurement and display functions, such as, for example, the temperature variation, can be achieved by connecting extra signal generator elements.

One of the microprocessor outputs can be connected to a plotter to record the development of the atmospheric pressure, thereby enabling the variations in atmospheric pressure to be plotted and evaluated on paper or film later, during calm weather conditions, or on land.

Added protection against corrosion and/or mechanical damage can be achieved, as well as producing a compact and easily-mounted device, by arranging the signal generator element, microprocessor, LCD, and warning device in a waterproof and salt-water resistant housing, designed to be set up or mounted on or in a wall.

In the preferred embodiment, the co-ordinates of the graphic atmospheric pressure variation display can be changed by means of film keyboard elements located on the housing. Specific sections of the atmospheric pressure variation display can thereby be more precisely evaluated, and the electronic recording manometer can thus be put to even more universal application, for example as an altimeter.

If a plotter is used for recording the development of the atmospheric pressure, it is then also possible to match the time intervals of the atmospheric pressure variations to the currently more conventional medium of recorder tapes. The film keyboard elements are waterproof, and are accordingly well-suited for use aboard ship.

A further refinement of the design according to the invention is obtained if the liquid crystal display is provided with a digital display of the wind speed which can be expected on the basis of the development of the atmospheric pressure and the latitude of the measurement location.

A finer degree of precision for the warning signal can be attained if the warning device is tripped by an abnormal drop in atmospheric pressure.

The geographical data can be input by the film keyboard elements. This enables the microprocessor to determine the wind speed which can be expected locally, on the basis of a table stored in the memory unit which contains the individual pressure rates allocated to particular wind speeds. Alternatively, a programmable formula can be used to determine the relationship between atmospheric pressure rate and wind speed.

The possible applications of the electronic recording manometer can be still further extended if the microprocessor and the liquid crystal display are equipped to provide a digital display of the temperature, actual wind speed, wind direction, and speed of the ship.

The microprocessor is characterized by additional outputs for connecting the relevant signal generator elements.

The microprocessor and the LCD can also be connected to a navigational instrument to provide a digital display of the latitude and longitude.

Based on the geographical data and the atmospheric pressure rate, the microprocessor is capable of determining the wind speed which is to be expected for the locality, as well as simultaneously providing a display of any abnormal atmospheric pressure drop.

Figure 2:
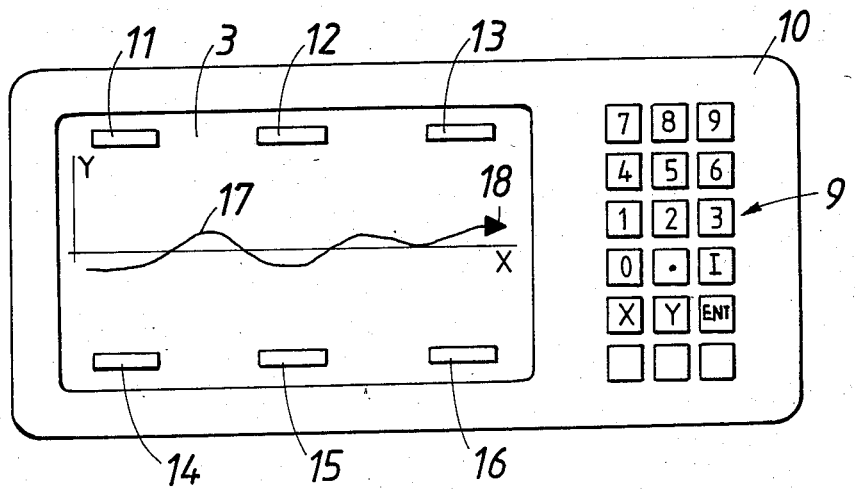

A preferred embodiment of the invention is described by way of example in more exact detail with the aid of the appended drawing. FIG. 1 shows a block diagram of an electronic recorder manometer according to the invention, and FIG. 2 shows a front view of the recording manometer according to FIG. 1 located in a housing, with the liquid crystal display and the film keyboard elements.

From the block diagram of an electronic recording manometer in accordance with the invention, as shown in FIG. 1, it will be seen that the atmospheric pressure signal generator element 1, which supplies output voltages indicating the prevalent atmospheric pressure, is connected via a preamplifier 5 and an analog frequency converter 6 to the input of a microprocessor 2. The signal generator element 1 is a monolithic (single-chip) piezo-resistant pressure converter; however, other signal generator elements can also be used. The microprocessor 2 is provided with integrated MOS switching circuits, a memory unit, and a quartz-movement clock unit 8. The preamplifier 5 and analog frequency converter 6 convert the pressure-equivalent output voltages of signal generator element 1 into pressure-equivalent input signal pulses for microprocessor 2.

The memory and clock units of the microprocessor 2 can be adjusted or called up by means of the film keyboard elements 9.

The liquid crystal display 3 is connected to one of the outputs of the microprocessor 2. The display of the development of the atmospheric pressure in the form of a curve on the LCD 3 is brought about by the fact that the pressure-equivalent pulses delivered per time unit are enumerated and stored in the microprocessor, and then converted to form the time and pressure co-ordinates of the image points which are to be activated in the liquid crystal display 3. In order to obtain as high a degree of precision as possible in the representation of the development of the atmospheric pressure with the image points available, the atmospheric co-ordinates are automatically extended for each individual preselected time basis, e.g. development of the atmospheric pressure over a twelve-hour period, to the maximum possible pressure fluctuation in this time interval. Accordingly, in relation to the preselected time basis, the pressure co-ordinates cover, for example, a variable range of atmospheric pressure from 10 to 100 mb. If the electronic recording manometer is being used as an altimeter, a shift of the pressure range is also put into effect, depending on the operational height, to the lower limit values of the pressure being displayed.

At the outputs 4 and 7 of the microprocessor 2 it is possible to connect a visual or acoustic warning device or a plotter, to record the development of the atmospheric pressure.

The pressure-equivalent electrical pulses undergo time-related conversion in the microprocessor 2, to form a digital atmospheric pressure display and a graphic display of the development of the atmospheric pressure in the LCD 3. These pulses are stored in the memory unit for a minimum of seven days. The memory unit also stores a calendar, enabling a digital display of the date to be shown in the liquid crystal display 3 as well as the time of day.

The visual and/or acoustic warning device connected to the output 4 of the microprocessor 2 is triggered when the atmospheric pressure rate, i.e. the atmospheric pressure change per time unit, exceeds a specific value; this value is preferably freely programmable between 0.5 to 5 mb/hour. The output 4 is activated when the atmospheric pressure difference between the pressure values acquired per minute and the pressure values acquired one hour before exceed a predetermined limit value. The visual warning device can, for example, consist of a warning text appearing on the liquid crystal display 3.

With the aid of the meteorological data and relationships stored in the memory unit, the microprocessor 2 can use the atmospheric pressure rate and latitude of the measurement location as a basis for determining the wind speed to be expected, and show this in digital form on the LCD 3. Supplementary signal generator elements can be used to enable the electronic recording manometer to provide also displays of the temperature, actual wind speed, wind direction, and similar data. With suitable adaptation, use as a temperature recorder, for example, can be considered without further ado.

Generator element 1, preamplifier 5, analog frequency converter 6, microprocessor 2, liquid crystal display 3, film keyboard elements 9, and possibly also the warning device are arranged in a waterproof and salt-water resistant housing 10, shown in broken lines in FIG. 1. The housing is designed for mounting or fastening on a wall, or forming an integrated unit.

FIG. 2 shows the front view of the housing 10 of an electronic atmosphere recording manometer for use on board a ship, illustrating the display and operation side of the housing 10. The housing provides a waterproof and salt-water resistant accomodation for the liquid crystal display 3 and a film keyboard element block 9. The LCD 3 displays a graphic atmospheric pressure development curve 17 with the pressure co-ordinate Y and time co-ordinate X. The curve of the march of pressure can, however, also be displayed on a grid frame graph with twelve vertical and ten horizontal lines. The LCD 3 preferably displays 256×128 image points. The atmospheric pressure march curve ends in each case in a flashing arrow 18, which indicates the direction of the trace and indicates by its flashing whether the instrument is operating. The liquid crystal display 3 is also fitted with six additional display fields, 11 to 16. These provide a digital display 11 of the date, 12 of the time of day, 13 of the atmospheric pressure, 14 of the wind speed to be anticipated from a particular atmospheric pressure rate, 15 of the preset latitude, and 16 of the temperature. The sequence of the display fields 11 to 16 can, however, also be different, and extra display fields can be provided. One design or another can be selected, depending on the application purpose—as a recording manometer on board ship or as an altimeter.

The arrangement of the film keyboard elements 9 and their functions are described only by way of example. A digit block and switch or keyboard elements are always provided, however, for the purpose of adjusting and calling up the microprocessor 2.

We claim:

1. An electronic atmospheric pressure recording manometer adapted for use aboard a ship, which comprises the combination of
   (a) a signal generator element emitting electrical output signals indicating prevalent atmospheric pressures,
   (b) a microprocessor having an input receiving the output signals and a plurality of outputs delivering electrical output signals responsive to the signals received from the generator element, the microprocessor including
      (1) a clock unit indicating passing time intervals during which the prevalent atmospheric pressure indicating signals are received and
      (2) a memory unit storing a calender indicating respective dates on which the prevalent atmospheric pressure indicating signals are received for the clocked time intervals as well as predetermined geographical and meteorological data,
   (c) a liquid crystal display connected to one of the microprocessor outputs for receiving the electrical output signals therefrom and having respective visual display fields optically displaying respective indicia in response to the received signals, the display fields including
      (1) a digital display of the prevalent atmospheric pressure and
      (2) a graphic display of a curve showing a development of atmospheric pressure changes over the clocked time intervals, and
   (d) an acoustic warning device connected to another one of the microprocessor outputs for receiving the electrical output signals therefrom and responsive to be actuated if the rate of the atmospheric pressure drop exceeds a predetermined value between 0.5 and 5 mb/h.

2. The electronic atmospheric pressure recording manometer of claim 1, wherein the display fields further include digital displays of the respective dates, of the time of day indicated by the clock unit, of the wind speed to be anticipated from the development of the atmospheric pressure changes and of the temperature as determined by the stored meteorological data, and of the latitude as determined by the stored geographical data.

3. The electronic atmospheric pressure recording manometer of claim 1, further comprising a plotter connected to yet another one of the microprocessor outputs for receiving the electrical output signals therefrom and responsive thereto for recording the curve showing the development of atmospheric pressure changes over the clocked time intervals.

4. The electronic atmospheric pressure recording manometer of claim 1, further comprising a waterproof and salt-water resistant housing containing the signal generator element, the microprocessor and the warning device, and visibly carrying the liquid crystal display.

5. The electronic atmospheric pressure recording manometer of claim 4, further comprising a keyboard on the housing for changing the coordinates of the curve showing the development of atmospheric pressure changes over the clocked time intervals.

* * * * *